United States Patent
Waas et al.

(10) Patent No.: US 7,769,744 B2
(45) Date of Patent: Aug. 3, 2010

(54) MISSING INDEX ANALYSIS AND INDEX USEAGE STATISTICS

(75) Inventors: Florian Waas, Seattle, WA (US);
Jueigen Thomas, Bellevue, WA (US);
Eric N. Hanson, Bellevue, WA (US);
Cesar A. Galindo-Legaria, Redmond, WA (US)

(73) Assignee: Microsoft Cororation, Redmond, WA (US)

( * ) Notice: Subject to any disclaimer, the term of this patent is extended or adjusted under 35 U.S.C. 154(b) by 555 days.

(21) Appl. No.: 11/292,679

(22) Filed: Dec. 2, 2005

(65) Prior Publication Data
US 2007/0130107 A1 Jun. 7, 2007

(51) Int. Cl.
*G06F 7/00* (2006.01)

(52) U.S. Cl. ................ 707/711; 707/718

(58) Field of Classification Search .......... 707/104.1, 707/10, 100, 3, 5
See application file for complete search history.

(56) References Cited

U.S. PATENT DOCUMENTS

| | | | |
|---|---|---|---|
| 5,301,314 A * | 4/1994 | Gifford et al. .......... 707/101 |
| 5,842,196 A | 11/1998 | Agarwal et al. .......... 707/2 |
| 5,852,821 A | 12/1998 | Chen et al. ............. 707/2 |
| 5,857,180 A * | 1/1999 | Hallmark et al. ........ 1/1 |
| 5,918,225 A | 6/1999 | White et al. ............ 707/3 |
| 5,930,785 A * | 7/1999 | Lohman et al. .......... 1/1 |
| 5,950,185 A * | 9/1999 | Alon et al. ............. 1/1 |
| 6,009,432 A | 12/1999 | Tarin ................. 707/10 |
| 6,058,398 A | 5/2000 | Lee .................. 707/104 |
| 6,134,541 A | 10/2000 | Castelli et al. ......... 707/2 |
| 6,243,699 B1 * | 6/2001 | Fish ................... 1/1 |
| 6,304,867 B1 | 10/2001 | Schmidt ............... 707/2 |
| 6,356,888 B1 | 3/2002 | Egan et al. ............. 707/2 |
| 6,470,330 B1 * | 10/2002 | Das et al. .............. 1/1 |
| 6,480,839 B1 * | 11/2002 | Whittington et al. ....... 707/3 |
| 6,529,901 B1 * | 3/2003 | Chaudhuri et al. ........ 1/1 |
| 6,697,818 B2 * | 2/2004 | Li et al. ................ 1/1 |
| 6,728,720 B1 | 4/2004 | Lenzie ................ 707/101 |
| 6,839,704 B2 | 1/2005 | Hughes et al. ........... 707/3 |
| 6,879,976 B1 | 4/2005 | Brookler et al. .......... 707/3 |
| 6,886,016 B2 * | 4/2005 | Hansen et al. ........... 1/1 |
| 7,092,954 B1 * | 8/2006 | Ramesh ................ 1/1 |
| 7,499,907 B2 * | 3/2009 | Brown et al. ............ 1/1 |
| 2003/0167255 A1 | 9/2003 | GraBhoff et al. ......... 707/1 |
| 2003/0217056 A1 * | 11/2003 | Allen et al. ............ 707/7 |
| 2005/0108199 A1 * | 5/2005 | Ellis et al. ............ 707/2 |
| 2005/0125409 A1 * | 6/2005 | Day et al. ............ 707/10 |

(Continued)

OTHER PUBLICATIONS

"Tips on Optimizing SQL Server Indexes", http://www.sql-server-performance.com/optimizing_indexes.asp, © 2000-2005, SQL-Server-Performance.com.

(Continued)

*Primary Examiner*—Hosain T Alam
*Assistant Examiner*—Leon Harper
(74) *Attorney, Agent, or Firm*—Woodcock Washburn LLP

(57) ABSTRACT

A method of accumulating and aggregating statistics concerning the use of database table indexes includes using a plurality of counters to register index use. The plurality of counters allow multiple instances of index usage to be recorded simultaneously. A missing index may be detected using an optimal index in a query plan. The optimal index is compared against the available indexes to determine if an index is missing. Statistics may be gathered against the used and missing indexes.

16 Claims, 4 Drawing Sheets

U.S. PATENT DOCUMENTS

| | | | |
|---|---|---|---|
| 2005/0267866 A1* | 12/2005 | Markl et al. | 707/2 |
| 2006/0074874 A1* | 4/2006 | Day et al. | 707/3 |
| 2006/0106839 A1* | 5/2006 | Shen et al. | 707/101 |
| 2007/0208690 A1* | 9/2007 | Schneider et al. | 707/2 |

OTHER PUBLICATIONS

"Extensible Indexing—What is it and Who Needs It?", Oracle Technology Network, http://www.oracle.com/technology/products/oracle8i/htdocs/ext.htm, 2005, 6 pages.

"Overcoming the Maintenance Problems and Costs Associated with Explosive Data Growth", http://www.sybase.com/detail?id+1037151, 2005, 1 page.

Fonseca, B., "Oracle, IBM Offer XML Indexing", http://www.eweek.com/article2/0,1895,1831307,00.asp, Jun. 24, 2005, 6 pages.

Miller, J.H. et al., "Microsoft SQL Server 2000 RDBMS Performance Tuning Guide for Data Warehousing: Take Advantage of SQL Server Performance Tools", http://www.microsoft.com/technet/prodtechnol/sql/2000/maintain/rdbmspft.mspx, Aug. 21, 2001, 63 pages.

* cited by examiner

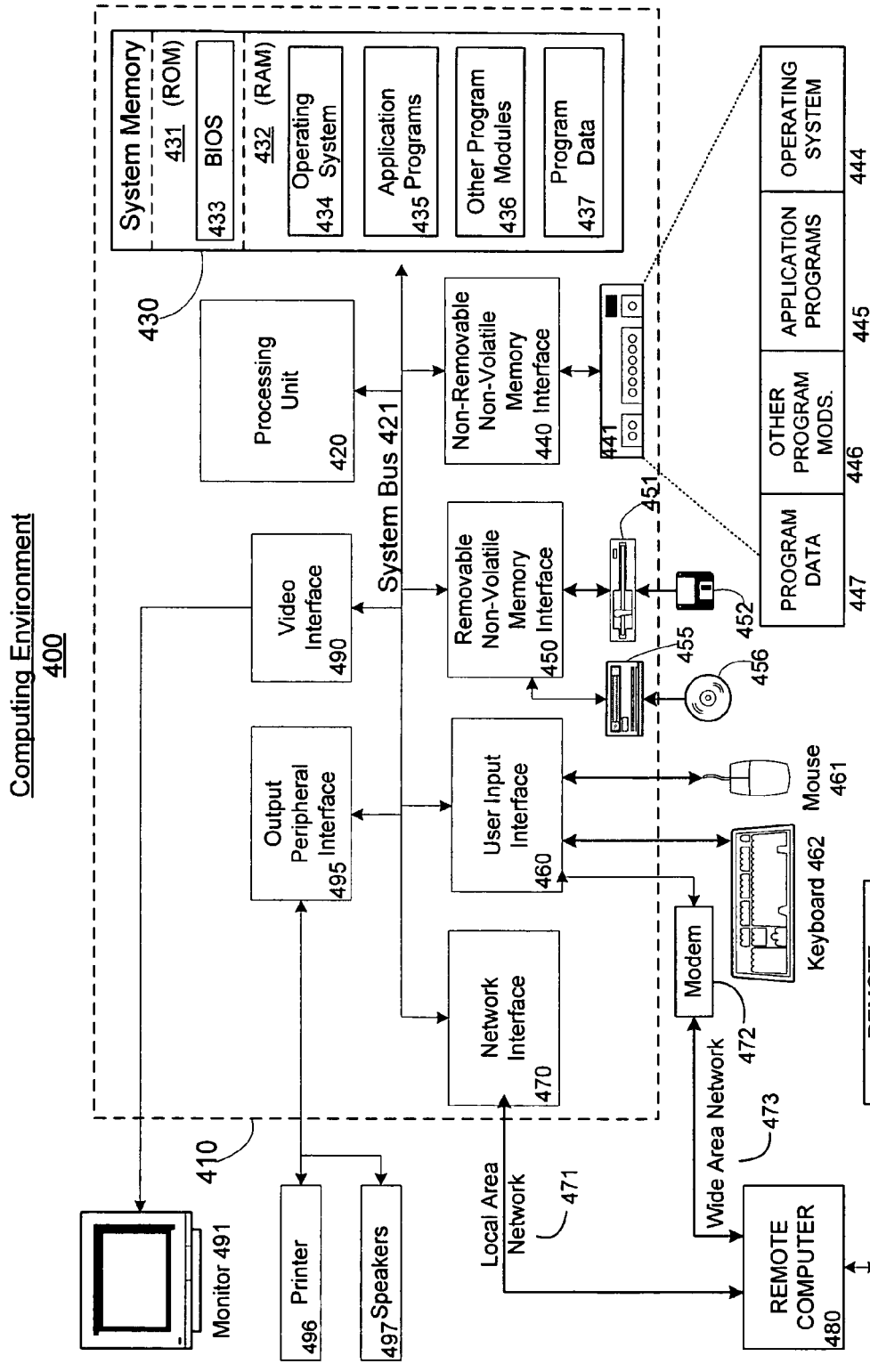

MISSING INDEX ANALYSIS AND INDEX USEAGE STATISTICS

BACKGROUND

Relational Database Systems, such as SQL Server™ available from Microsoft® in Redmond Wash., allow users to index data in various ways. Indexes can speed up data access by orders of magnitude. A query against the database can force a scan of columns of one or more tables within the database. If the tables are large, the scan can be very time consuming. The query can be shortened if the columns of the database tables are indexed. Using an index to find data in a given column can be an efficient method of searching. But, an indexed column requires maintenance to be effective. For example, indexes need to be updated whenever data changes occur to keep the indexes accurate. If the data changes, the corresponding index which can refer to that changed data must be updated if the changed data is to be found in a query through the use of an index. If an entry in a row or column is deleted, the index should be updated.

It is clear that some indexes may be used quite frequently while other indexes may not be used via a query very often. Given the mix of frequently used and infrequently used indexes on a database, some concerns arise. The concerns include whether the maintained indexes are being used, if so, are they being used effectively, and are the indexes being used with insight with respect to their storage. If all permutations of indexes were generated with a database table, then the storage requirements for index storage would rise precipitously and maintenance operations would incur unacceptable overhead to data changes. Also, over time, the manner in which a database is used may change. This change may result in a use that neglects the use of some indexes and may indicate a need for greater use of other indexes.

In some instances, queries against a database may present opportunities to generate indexes which do not currently exist in the table. To date, the prior art has not well accommodated characterization of the use of indexes in databases.

SUMMARY

An aspect of the invention includes a technique for generating statistics of index usage in a database management system. The technique includes the use of a plurality of counters. The counters are incremented upon an instance of index usage. The counters are configured such that multiple simultaneous usages of the index may be recorded. An index usage may occur from multiple executions of the same query or from an execution of a different query.

In another aspect of the invention, a missing index may be detected. A query plan has an optimal set of groups of indexes. The optimal index groups are used as a point of comparison to identify indexes useful in the query. If no indexes correspond to the optimal index groups in any way, then a missing index condition is detected. Statistics may be generated against the missing index groups.

In one aspect of the invention, a cost is generated as a result of the missing index. The cost may be a dimensionless indication of how much the query plan execution could be improved if the missing index were created and made available to the database management system. In one aspect of the invention, a query header may be used as a storage mechanism for statistics on the indexes used and statistics on missing indexes encountered while optimizing this query along with the query plan.

BRIEF DESCRIPTION OF THE DRAWINGS

In the drawings:

FIG. 4 is a block diagram showing an example computing environment in which aspects of the invention may be implemented.

DETAILED DESCRIPTION OF ILLUSTRATIVE EMBODIMENTS

Exemplary Embodiments

In one aspect of the invention, statistics are generated associated with every query. Normally, a client query is submitted as a program formulated in any of a plurality of query languages including SQL or XQuery. The query engine receives the query and the text is parsed, bound and optimized. The query engine produces a query plan which is stored in cache. Each time the query is executed, the plan is retrieved from the cache, executed and again stored in the cache.

Figure 1A:
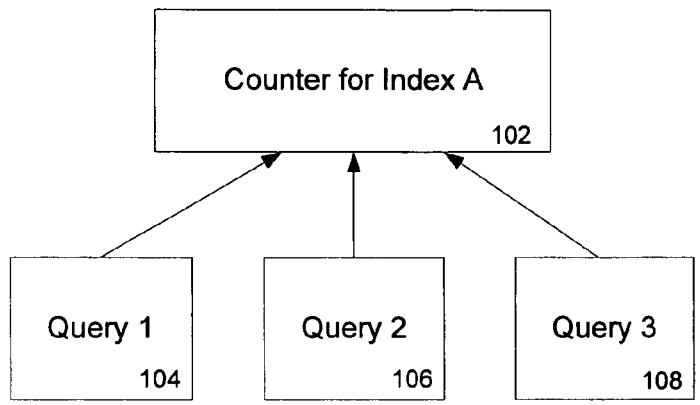
FIG. 1a is a block diagram showing an example of an index counter.

In one embodiment, statistics may be gathered via the use of counters associated with the query plan. FIG. 1a depicts a counter configuration 100. Using a counter scheme, a counter for an index 102 associated with the query plan is incremented every time the index is used. For example, if a first query 104 uses the index, counter 102 is incremented. A second query 106 may also increment the index counter as may a third query 108. The problem with this type statistics gathering is the contention that counter 102 experiences when any of queries 104, 106 or 108 arrive simultaneously. Heightened contention on a counter can lead to an overall drop in performance of processing a query.

Figure 1B:
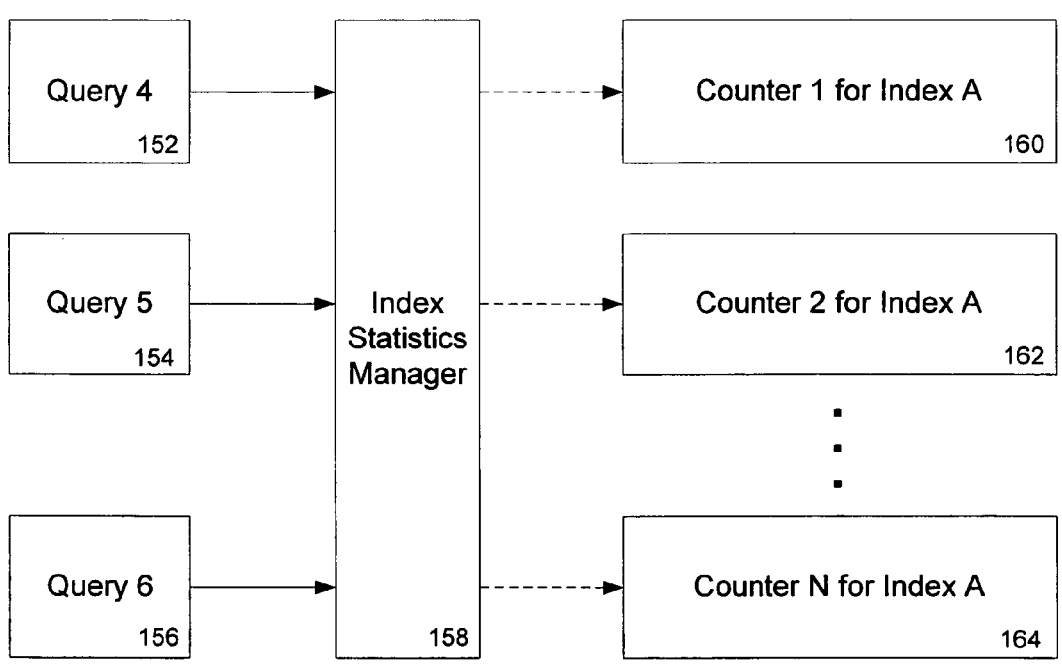
FIG. 1b is a block diagram showing an improved technique for implementing an index counter.

FIG. 1b depicts an alternative index counter configuration 150. In this instance, there are N number of index counters 160, 162, 164 for index A. Index Statistics Manager (ISM) 158 is used to resolve contentions by switching or routing an incoming query increment request to a counter that is not being incremented. For example, if query 152 and query 156 arrive simultaneously at ISM 158 to increment a counter for index A, the ISM can simultaneously route query 154 to index A counter 160 and route query 156 to a second index A counter 162. Thus, each simultaneous incidence of query requiring the use index A can be accurately counted even if one query locks and holds one of the counters. In this instance, the ISM 158 simply redirects new query instances. For example, if query 156 requests and increment to a next counter for index A, and counter 160 is in use, then counter 162 or 164 may be selected by the ISM to accommodate the increment request by query 156. In general, the ISM 158 directs the next incoming request to increment a counter to the next available counter.

Index usage statistics may be obtained by adding up all of the counters for an index, for example, counters 160 through 164. Index usage statistics may be recorded in the header of the query plan for the respective index used. Each time the query is executed or retrieved from the cache, the list of indexes is processed and accumulated. In one embodiment, an index statistics manager can accumulate the index usage statistics for a group of indexes and present the information for a user to evaluate.

In one embodiment, an index statistics manager maintains a number of hash tables in which it records usage records for individual indexes. The hash tables may be used in conjunction with counters 160 through 164. Here, as before, using more than one hash table and recording usages in different hash tables according to a round-robin scheme reduces contention points in highly concurrent query workloads where a very large number of queries are executed concurrently.

In another embodiment, the index statistics manager can have a Data Description Language (DDL) operation defined and connected to the manager. The DDL defines the index statistics data to mange the gathered statistics. For example, index usage records may be dropped if the index itself is dropped, the underlying table for the index is dropped, or the database itself is dropped or detached. This allows only active indexes to have statistics which are maintained.

In one embodiment, the examination of the index statistics may be exposed using a dynamic management view (DMV). The view generally includes the generation of the index statistics data that is consolidated from different sets of counters as used in the contention avoidance scheme described above. In one aspect of the invention, the generation of index statistics occurs automatically with each executed query. But the generation of a dynamic management view may be significantly more expensive in computing time than the recording of index usage records. In one embodiment, the statistics collection mechanism including the counters is write-optimized to collect data efficiently during the execution of a query.

Figure 2:
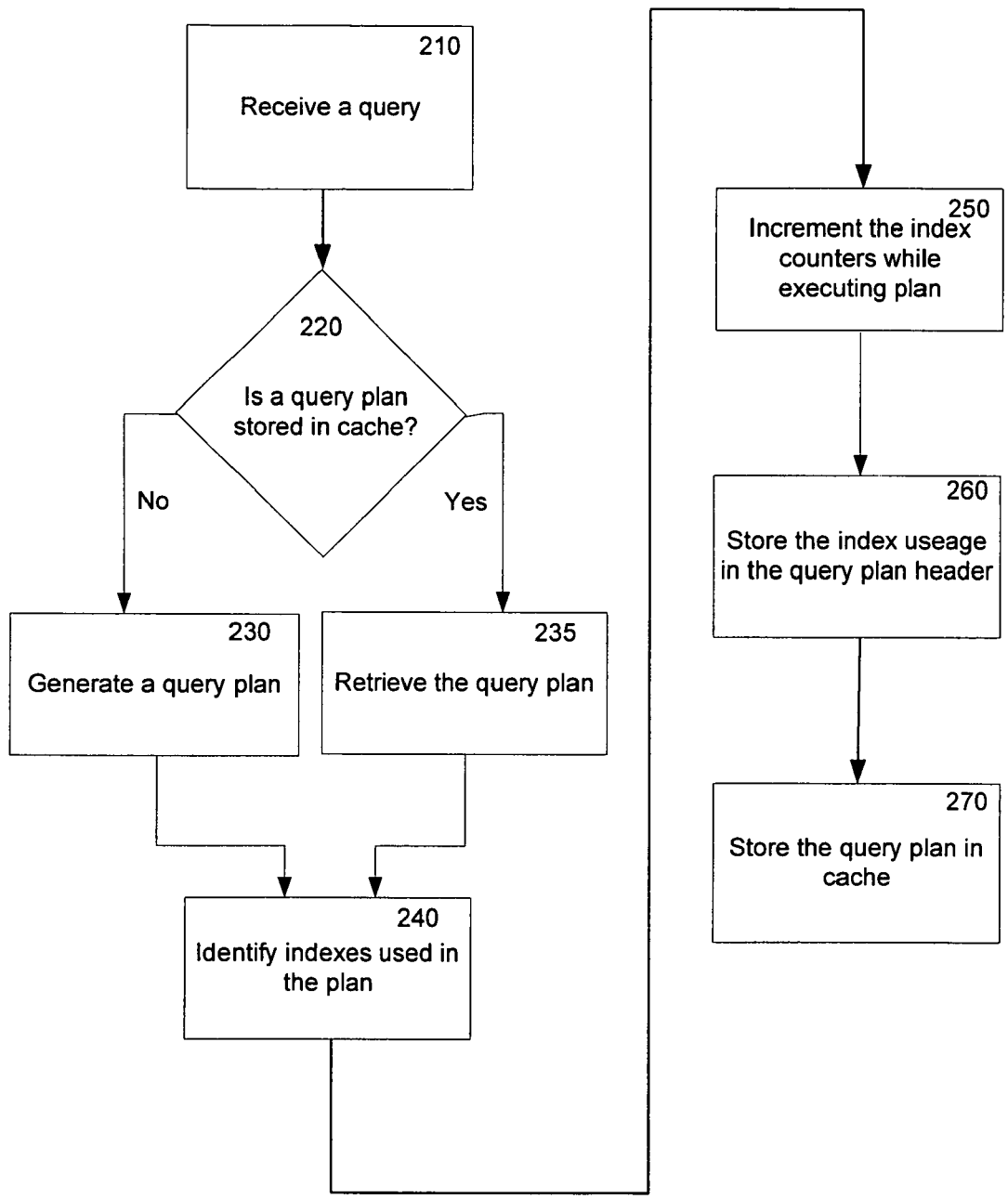
FIG. 2 is example flow diagram of a method according to the index usage aspect of the invention.

FIG. 2 is a flow diagram 200 showing a method of collecting statistics in a query engine. Initially a query is received (step 210). A determination is made as to whether a query plan for the received query is cached (step 220). If a query plan is not stored in cache, a new plan is generated (step 230). If a plan is stored in cache, the stored plan is retrieved (step 235). The method 200 then identifies indexes used in the generated or retrieved plan (step 240).

During execution of the query plan, counter mechanisms, corresponding to the indexes used in the plan, are incremented (step 250) to collect data on index use during the query. In one aspect of the invention, multiple concurrent index usage increments may be encountered during the execution of the query plan for the index being used. The index may be used in a different concurrent query or in the same but concurrent query plan execution. After execution of the query plan, the usage indication is stored in the query plan header (step 260). The query plan, with the new information placed into the header, may then be placed into cache for storage (step 270).

System administrators may use diagnostic programs in a database management system to input the raw statistics from a statistics manager to produce useful results from the gathering of index use statistics. For example, system administrators may use diagnostic programs which input usage statistics to determine exactly how many times an index was used for different types of usages. The usage include read, write and update accesses. This enables the acceleration of query processing if an optimized set of indexes is used. Usage statistics may indicate how many times maintenance operations on indexes are present so that a source of potential slowdown in a database can be more easily identified. A system administrator can rank and compare different indexes according to their value. Usage patterns and use frequency of an index may be determined.

A system administrator can use the statistics to identify useless indexes. In one aspect of the invention, statistics on the use of indexes in a database is provided. Statistical information on index usage may not be useful unless it is compared against some standard for comparison purposes. Accordingly, another aspect of the invention involves calculating a value for an index. The "value" of an index can be thought of as the balance between the number of read accesses that were accelerated by the index and the number of maintenance operations that need to be performed in reaction to data changes. An index which is not used at all or not used in read accesses but incurs substantial maintenance overhead is of very little value. An index which is used in a large number of read accesses and requires only very little maintenance is considered very valuable. The determination of value enables the identification of useless indexes. Useless indexes may be defined as indexes having a high maintenance overhead without significant utility in queries. Such useless indexes can pose significant performance bottlenecks. Being able to assess the value of an index is essential to trouble-shooting and tuning of database servers deployed in production.

An administrator can inspect the dynamic management view which exposes index usage statistics to provide a proper assessment of indexes without reproducing the queries to observe the problem. This enables administrators to diagnose and resolve performance problems originating from useless indexes quickly.

In one embodiment, a program that maintains statistics concerning index usage on a per query basis is implemented. This statistics management program accesses index counters for operations such as seeks, scans, lookups, and updates of indexes as well as the last time of utilization of an index. Table 1 includes a description of index usage statistics for a typical embodiment of the invention.

TABLE 1

Typical Index Usage Statistics

| | |
|---|---|
| Database id | Database identifier of underlying table |
| Object id | Object identifier of underlying table |
| Index id | Identifier of index |
| User seeks | Number of user queries which performed an index seek operation on the index |
| User scans | Number of user queries which performed a scan on the index |
| User lookup | Number of user queries which used an index for a row lookup |
| User updates | Number of user queries which maintained an index as part of a update to underlying data |
| Last user seek | Start time of last user query which used the index to seek. |
| Last user scan | Start time of last user query which used the index to scan |
| Last user lookup | Start time of last user query which used the index to lookup |
| Last user update | Start time of last user query which used the index to update |
| System seeks | Number of system queries which performed index seek operations on the index |
| System scan | Start time or number of system queries which used the index to scan |
| System lookup | Start time or number of system queries which used the index to lookup |
| System update | Start time or number of system queries which used the index to update |

The Table 1 information is not exhaustive and is only an example of typical index usage statistics by either a user or a system. The Table 1 information may be used to assess the usefulness of an index by computing the sum of all reads by selecting user seeks plus user scans plus user lookups. In general, the present invention provides the raw data for the generation of computed statistics. A user program, which aggregates the index statistics can be the analysis tool for making assessments on the effectiveness of an index in a database.

In another aspect of the invention, a missing index statistic may be generated. In some relational database query processors, the query optimizer analyzes predicates with respect to whether they can be evaluated using available indexes. Consider the following example:

```
SELECT P_CONTAINER, P_BRAND
FROM PART
WHERE
P_CONTAINER = 'MED BOX'
```

In this example, without any indexes on the table PART, the execution of this query requires the scanning of the entire PART table. But, the query can be answered more efficiently if there were an index on P_CONTAINER which can be used to look up qualifying rows before gathering additional columns needed to return the entire SELECT list. Accordingly, the index on P_CONTAINER is considered missing and results in a performance burden for the database.

In general, as part of a query plan generation, an optimizer determines the specifications of optimal indexes. The optimal indexing may be one or more single indexes or it may be a composite index. In most present systems, this optimal index information is discarded if the optimal indexes are not available during the execution of the query plan. The present invention uses optimal index specifications and keeps information concerning missing optimal indexes. Such counts are aggregated and may be presented as a missing index indication.

Figure 3:
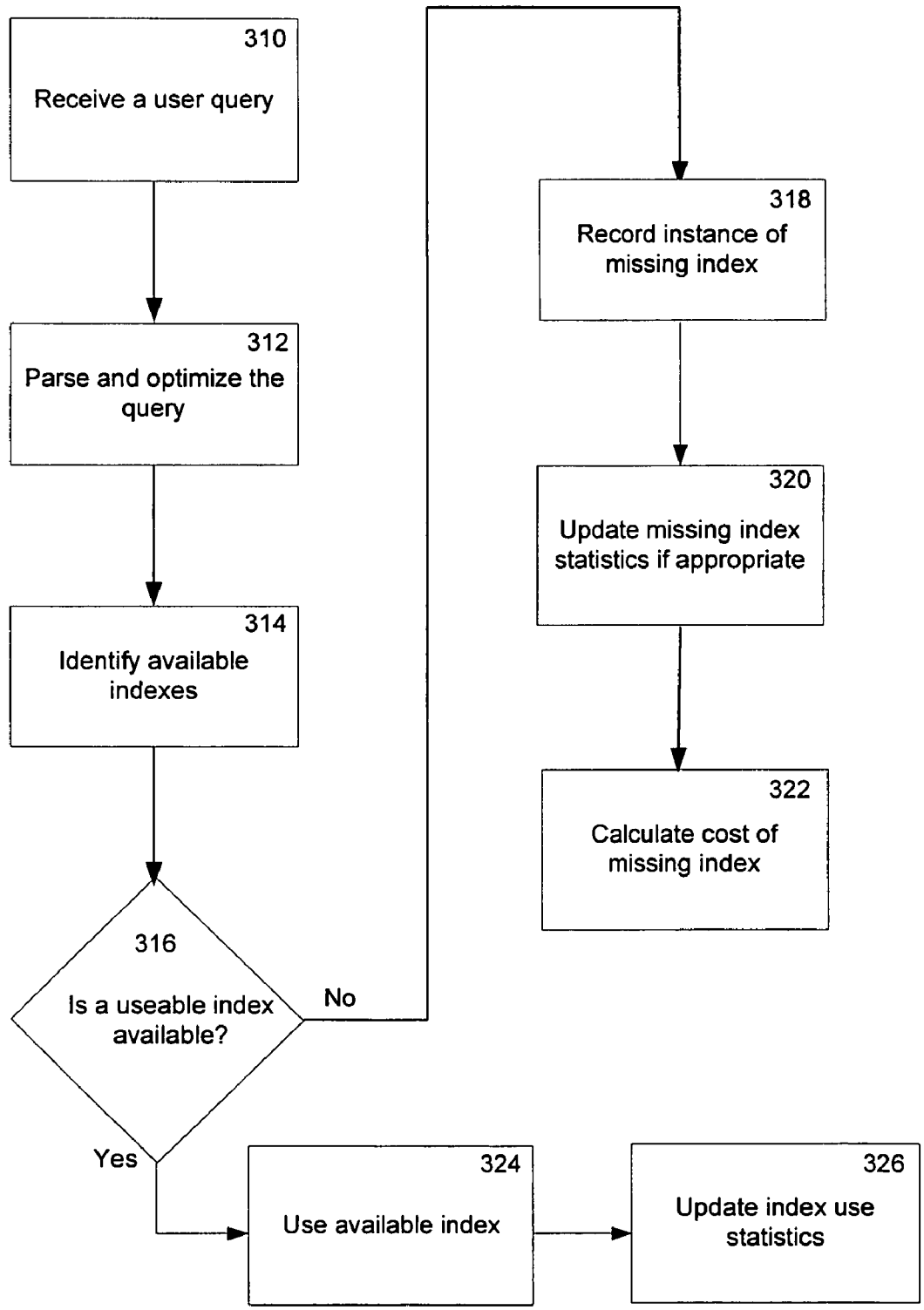
FIG. 3 is example flow diagram of a method according to the missing index aspect of the invention.

FIG. 3 is an example flow diagram of a method 300 to record an instance of a missing index. The method 300 is initiated by the reception of a user query (step 310) against a database. The received query is parsed and optimized (step 312) by the query processor. During optimization, predicates are checked against all existing indexes on the base tables that are referenced in the query to determine if an index useful to the query plan is available (step 314). If an index useful for the execution of the query plan is found (step 316), then the available index is used in the execution of the query plan (step 324). Optionally, usage statistics on the available index may then be recorded (step 326).

If an index useful for the execution of the query plan is not found (step 316), then the instance of a missing useable index is recorded (step 318). A missing index may be identified by comparing an optimal index identified in the query plan to any other single or composite indexes on columns that exist related to the desired query. If no single or composite index exists that compares to the optimal index, then a useable index for the query is considered missing. In one embodiment, an update of missing index statistics is generated (step 320). This update creates an indication of how often a missing index could have been accessed to accommodate the query plan. In one embodiment, the cost of a new index can be optionally calculated (step 322) based on the expected number of I/O and CPU accesses that the optimal index would require in order to satisfy the query. This number can be considered dimensionless. This number can then be compared against the actual cost of performing the query execution without an index. The comparison may indicate that a new index is appropriate for execution of the query in the database management system.

In another embodiment, steps 318 and 320 are reversed in order such that the recording of an instance of a missing index is performed if the cost benefit is significant and if there are no other similar indexes already present. This embodiment allows only high value missing indexes to be recorded. Thus, a user may conclude that all of the missing index recordings under this embodiment, if performed often, would be worthwhile to create to improve the efficiency of the query processor. In one embodiment, this cost is scaled to be within a range of 0 to 100 to indicate a percentage of improvement if the missing index were created.

In another aspect of the invention, for each missing index group, the relational database management system can maintain counters which indicate how many times a query which could have benefited from creating a given missing index is executed. In addition to the pure count, the total query cost as estimated by the optimizer may also be recorded. Since different queries could benefit from the same index, this value is the average across different query executions. This may include both the same query executed repeatedly as well as different queries. In one embodiment, the impact of an index may be indicated by a value between 0 and 100 arranged over all queries which could have used the index in question.

In one embodiment, missing index statistics may be gathered and exposed through four system tables. The first table is a missing index group statistics table. In this table, statistics of missing index groups may include the number of queries which could have used the index, the number of unique compiles, and the total query cost and impact of the index.

A second table is the missing index details table. This table may include a description of individual indexes which contains the database and object identifiers as well as columns and their usage, including equality and inequality, and the complete index DDL statement which include the indexes that are identified by an index handle.

A third table is the missing index groups table. This table may include a view which maps missing indexes to missing index groups by listing pairs of index group handles and individual index handles. A fourth table is the missing index columns table. This table may list the columns involved in a missing index description including the name, the column identifier, and the usage type.

In one embodiment, a program that maintains statistics concerning missing index groups is implemented. This statistics management program accesses index counters for operations related to the index usage and missing index data. Table 2 includes a description of missing index statistics items for a typical embodiment of the invention. Table 2 is not exhaustive and serves to indicate examples of typical missing index statistics.

TABLE 2

Typical Missing Index Statistics

| | |
|---|---|
| Group Handle | Internal identifier of missing index group |
| Unique compiles | Number of compiles where the index was found missing |
| User seeks | Number of user queries which performed an index seek operation on the index |
| User scans | Number of user queries which performed a scan on the index |
| Last user seek | Start time of last query which used the index to seek. |

TABLE 2-continued

Typical Missing Index Statistics

| | |
|---|---|
| Last user scan | Start time of last query which used the index to scan. |
| Average total user cost | Average total query cost |
| Average total user impact | Average cost benefit |
| System seeks | Number of system queries which performed index seek operations on the index |
| index handle | Internal identifier of missing index |
| Database id | Database identifier of underlying table |
| Object id | Object identifier of underlying table |
| Equality columns | Columns on which equality predicates were formulated |
| Inequality columns | Columns on which inequality predicates were formulated |
| Included columns | Columns required by the query |

Exemplary Computing Device

FIG. 4 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, non-volatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a system to gather statistics on indexes in a database. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method of generating statistics concerning index usage, the method comprising:
   receiving two or more queries against a relational database, the two or more queries received concurrently;
   executing a query plan corresponding to each of the received queries, each query plan having an associated index;
   incrementing a value of a first index counter of a plurality of index counters of the index every time the index is used during execution of a first query, each index counter of the plurality of index counters storing a value, wherein a total value obtained by adding the values of all of the plurality of index counters indicates a usage of the index, and wherein execution of the first query locks and holds the first index counter;
   incrementing a value of a second index counter of the plurality of index counters of the index when the index is used during execution of a second query, wherein the first query and the second query are concurrently executed, wherein contention between increments to any of the plurality of index counters is avoided such that multiple usages of the index may be recorded simultaneously;
   determining index usage statistics responsive to incrementing by adding the values of all of the plurality of index counters of the index, wherein index usage statistics include at least one of user seeks, user scans, user lookup, user updates, last user seek, last user scan, last user lookup, last user update, system seeks, system scan, system lookup or system update; and
   storing, in a memory, the index usage statistics in a header of the query plan.

2. The computer-implemented method of claim 1, wherein executing a query plan comprises:
   determining if a query plan for the query is stored in cache;
   retrieving a stored query plan for the query; and
   executing the query plan corresponding to the received query.

3. The computer-implemented method of claim 1, wherein executing a query plan corresponding to the received query comprises creating an optimized query plan and executing the optimized query plan.

4. The computer-implemented method of claim 1, wherein incrementing a value of at least one index counter during execution of the query plan comprises incrementing a counter selected by a router, the router selecting one of the plurality of counters.

5. The computer-implemented method of claim 1, further comprising storing the query plan in cache.

6. A computer-implemented method of identifying a missing index in a relational database management system, the method comprising:
   receiving a user query in the relational database management system;
   parsing and optimizing a query plan for the received query;
   identifying an optimal index corresponding to the query plan, wherein the optimal index is an index that is useful to the query plan, and wherein identifying the optimal index includes computing the sum of all reads by adding the number of user queries that performed an index seek on the index, the number of user queries that performed a scan on the index and the number of user queries that used an index for a row lookup;
   identify existing available indexes useable by the query plan;
   comparing the optimal index to the existing available indexes;
   determining if an index useable by the query plan is missing; and
   updating statistics related to the missing index if the index is determined to be missing, by adding values of all counters of a plurality of index counters associated with the missing index, each counter of the plurality of index counters storing a value, wherein a total value obtained by adding the values of all of the plurality of index counters indicates a usage of the index, and wherein execution of a first query plan locks and holds a first index counter and a value of a second index counter of the plurality of index counters of the index is incremented when the first counter is locked and held and when the index is used during execution of a second query, wherein the first query and the second query are concurrently executed, wherein contention between increments to any of the plurality of index counters is avoided such that multiple usages of the index may be recorded simultaneously, and wherein the statistics include a number of times that the missing index could have been accessed to accommodate the query plan and a number of times a query, which could have benefited from creating the missing index, is executed.

7. The computer-implemented method of claim 6, wherein contention between each index counter of the plurality of index counters is avoided by using a router associated with the plurality of index counters.

8. The computer-implemented method of claim 7, wherein the multiple usages occur from at least one of another instance of the received query and an instance of a different query which uses the same missing index.

9. The computer-implemented method of claim 6, further comprising calculating a cost of the missing index.

10. The computer-implemented method of claim 9, wherein calculating a cost of the missing index comprises comparing a cost of running the query plan using the optimal index against a cost of running the query plan using no index.

11. The computer-implemented method of claim 10, wherein cost comprises a dimensionless number representing at least one of I/O cycles and CPU accesses.

12. The computer-implemented method of claim 10, wherein cost is scaled from 0 to 100.

13. A system for detecting a missing index in a database, the system comprising:
   a processor executing software that provides:
   means for executing a query plan against a database, the database having a fixed number of indexes, the query plan identifying an optimal index, wherein the optimal index is an index that is useful to the query plan, wherein identifying the optimal index includes computing the sum of all reads by adding the number of user queries that performed an index seek on the index, the number of user queries that performed a scan on the index and the number of user queries that used an index for a row lookup;
   means for indicating a number of times a missing index is detected; and
   means for implementing a software program which gathers statistics on index use the statistics determined by adding values of all counters of a plurality of counters associated with the missing index, each counter of the plurality of counters storing a value, wherein a total value obtained by adding the values of all of the plurality of counters indicates a usage of the index, and wherein execution of a first query locks and holds a first index counter and a value of a second index counter of the plurality of index counters of the index is incremented when the first counter is locked and held and when the index is used during execution of a second query, wherein the first query and the second query are concurrently executed, wherein contention between increments to any of the plurality of counters is avoided such that multiple usages of the index may be recorded simultaneously, and wherein the statistics include a number of times that the missing index could have been accessed to accommodate the query plan and a number of times a query, which could have benefited from creating the missing index, is executed, wherein upon executing the query plan, a missing index is detected by comparing the optimal index against the fixed number of indexes to determine if any index is useable with the query plan, and wherein, if none of the fixed indexes are useable with the query plan, incrementing the at least one counter to identify an instance of a missing index.

14. The system of claim 13, wherein the software program computes a cost of the missing index.

15. The system of claim 14, wherein the cost of the missing index comprises a number representative of I/O and CPU accesses needed to execute the query plan with a missing index.

16. The system of claim 13, further comprising a monitor which displays the statistics of index use.

* * * * *